United States Patent [19]
Bhanot et al.

[11] Patent Number: 5,457,609
[45] Date of Patent: Oct. 10, 1995

[54] CHARGING CONTACT FOR USE WITH A BATTERY POWERED ELECTRONIC DEVICE

[75] Inventors: Vivek Bhanot; Zainal A. M. Yahya; Tai C. Thiam, all of Singapore, Singapore

[73] Assignee: Motorola, Inc., Schaumburg, Ill.

[21] Appl. No.: 222,063

[22] Filed: Apr. 4, 1994

[51] Int. Cl.[6] .................................................. H04B 1/03
[52] U.S. Cl. .................... 361/814; 361/769; 361/744; 361/803; 361/807; 455/349; 200/277; 429/99
[58] Field of Search ..................... 361/769, 787, 361/744, 789, 790, 803, 808, 807, 809, 814; 429/96–100; 455/347, 349; 200/278, 277

[56] References Cited

U.S. PATENT DOCUMENTS

| | | | |
|---|---|---|---|
| 2,902,628 | 9/1959 | Leno | 361/784 |
| 3,148,310 | 9/1964 | Feldman | 361/784 |
| 4,922,376 | 5/1990 | Pommer et al. | 361/386 |
| 5,321,583 | 6/1994 | McMahon | 361/770 |
| 5,353,191 | 10/1994 | Volz et al. | 361/744 |

*Primary Examiner*—Leo P. Picard
*Assistant Examiner*—Y. Whang
*Attorney, Agent, or Firm*—Kelly A. Gardner; John H. Moore; Daniel K. Nichols

[57] ABSTRACT

A battery powered device (100) utilizing a rechargeable battery (135) comprises a ball bearing (300) having a first diameter for receiving a current and a housing (200) having an opening (405) formed therethrough in which the ball bearing (300) is situated, wherein the opening (405) has a second diameter of less than the first diameter. The battery powered device (100) further comprises a spring (305) situated in the opening (405) in contact with the ball bearing (300) and a spring cap (310) fastened to the housing (200) for forcibly holding the spring (305) in contact with the ball bearing (300). A conductive element is coupled between the spring and the rechargeable battery such that the current received by the ball bearing (300) is supplied to the rechargeable battery (135) via the spring (310).

19 Claims, 3 Drawing Sheets

CHARGING CONTACT FOR USE WITH A BATTERY POWERED ELECTRONIC DEVICE

FIELD OF THE INVENTION

This invention relates in general to battery powered devices, and more specifically to battery powered devices which are rechargeable.

BACKGROUND OF THE INVENTION

Many conventional electronic devices are battery powered such that a user of a device can carry the device and use it when away from locations in which a/c power is available. Examples of such devices are calculators, portable radio pagers, portable computers, and toys. These devices may use either non-rechargeable batteries or rechargeable batteries. Non-rechargeable batteries typically have a greater capacity, i.e., longer life, than do rechargeable batteries, but non-rechargeable batteries must be discarded and replaced with new batteries when they are no longer capable of powering the devices. On the other hand, rechargeable batteries can simply be charged through the use of conventional charging fixtures which are usually sold with the battery powered device.

Devices employing rechargeable batteries often have contacts formed on the device such that the batteries can be recharged without removal from the device. Generally, a portable device is simply inserted into a charger which has contacts that match with contacts on the portable device. Current is then supplied through the contacts to recharge the batteries internal to the device. The majority of portable devices in which batteries can be recharged, however, utilize specially manufactured charging contacts which must be designed and tooled by the manufacturer. As a result, many charging contacts used in portable devices are much more expensive than would be the case if off-the-shelf parts were utilized. This cost is ultimately passed on to the consumer in higher price portable devices and chargers.

Thus, what is needed is a reduced-price charging contact for use with a battery powered device.

SUMMARY OF THE INVENTION

A battery powered device utilizing a rechargeable battery comprises a ball bearing having a first diameter for receiving a current and a housing having an opening formed therethrough in which the ball bearing is situated, wherein the opening has a second diameter of less than the first diameter. The battery powered device further comprises a spring situated in the opening in contact with the ball bearing and a spring cap fastened to the housing for forcibly holding the spring in contact with the ball bearing. A conductive element is coupled between the spring and the rechargeable battery such that the current received by the ball bearing is supplied to the rechargeable battery via the spring.

DESCRIPTION OF A PREFERRED EMBODIMENT

Figure 1:
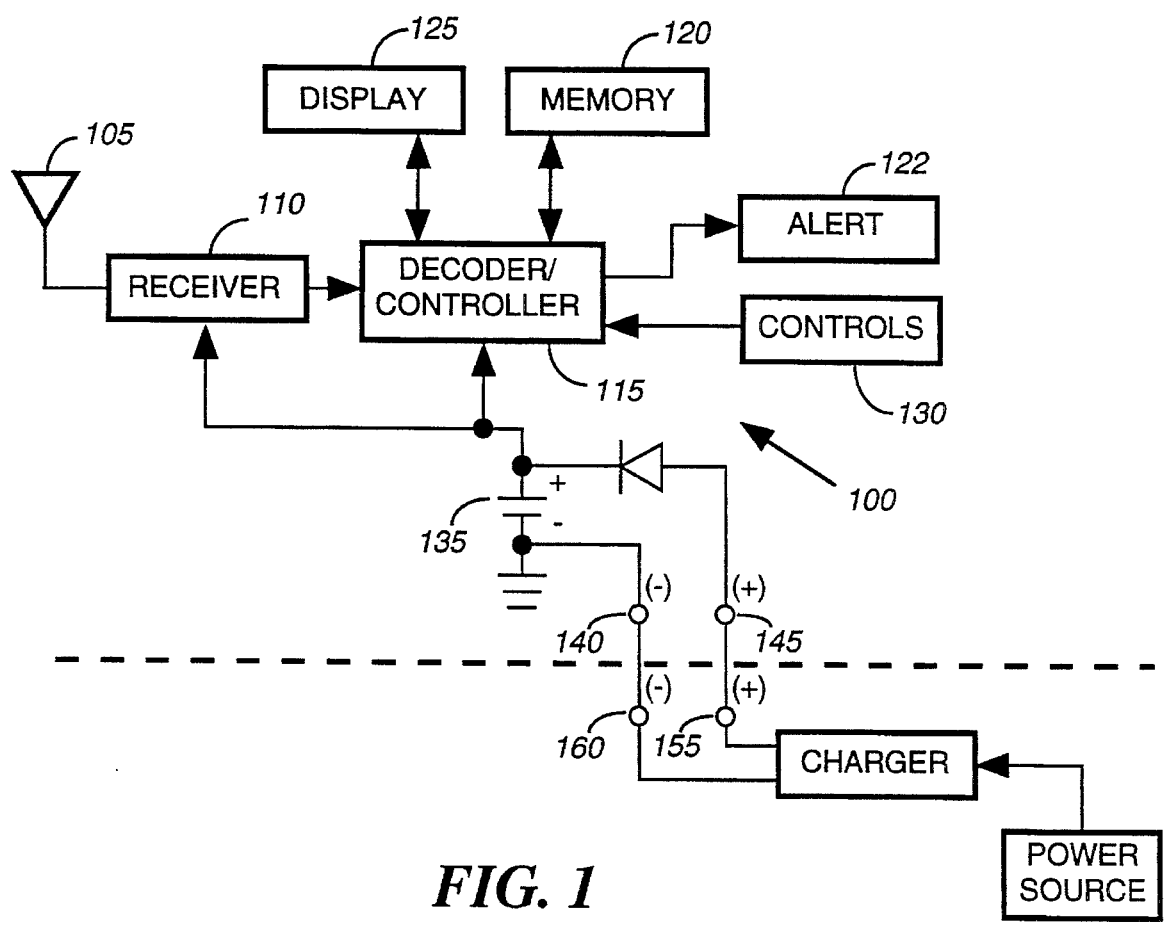
FIG. 1 is a block diagram of a battery powered device utilizing a rechargeable battery in accordance with the present invention.

As mentioned briefly hereinabove in the Background of the Invention, many portable battery-powered devices utilize rechargeable batteries which can be recharged by inserting the device into a charger, which then supplies current through charging contacts on the device to recharge the batteries. One such type of portable device is a radio pager 100, which is usually carried by a subscriber to a paging system such that the subscriber can receive messages over the air.

The radio pager 100 usually comprises an antenna 105 for receiving a radio frequency (RF) signal and providing the RF signal to a receiver 110, which demodulates the signal. The demodulated signal is then provided to a decoder/controller 115 for recovering a message included in the RF signal. The message is thereafter stored in a memory 120, such as a random access memory, and the decoder/controller 115 activates an alert 122 to announce message reception to a user. The message can be retrieved from the memory 120 and provided to a display 125 either automatically or in response to user manipulation of controls 130.

The radio pager 100 further comprises a battery 135 coupled to the decoder/controller 115 and the receiver 110 for providing power thereto. The battery 135 is preferably a rechargeable battery, such as a nickel-cadmium battery, to which charging contacts 140, 145 are electrically coupled at the negative and positive battery terminals, respectively. When the battery 135 is depleted, the radio pager 100 is coupled to a charger 150, which has matching positive and negative contacts 155, 160. The charger 150 provides current to the battery 135 such that the battery 135 is recharged.

Conventionally, contacts provided on a portable device are designed and tooled separately from other device elements. As a result, the cost of such contacts can be relatively high. This price is reflected in a higher product cost, which is passed on to the consumer. In accordance with the present invention, on the other hand, charging contacts are provided which employ off-the-shelf parts. Therefore, the charging contacts 140, 145 in the radio pager 100 are less expensive, resulting in a less expensive product for sale to the consumer.

Figure 2:
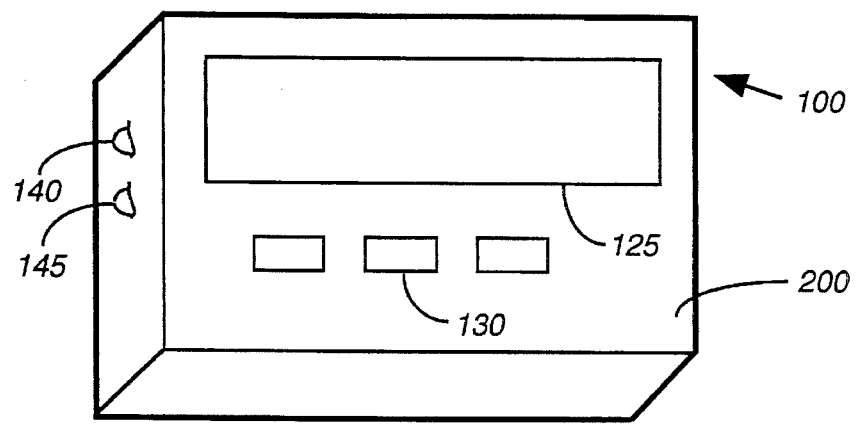
FIG. 2 is a perspective view of the battery powered device of FIG. 1 in accordance with the present invention.

Referring next to FIG. 2, a perspective view of the radio pager 100 is depicted. The radio pager 100, as described above, includes the two charging contacts 140, 145, which are accessible from the exterior of the housing 200 of the radio pager 100 for electrically coupling to corresponding contacts 155, 160 of the charger 150. Preferably, the conductive surfaces of the contacts 140, 145 comprise conventional, off-the-shelf ball bearings, as may be better understood by referring to FIG. 3.

Figure 3:
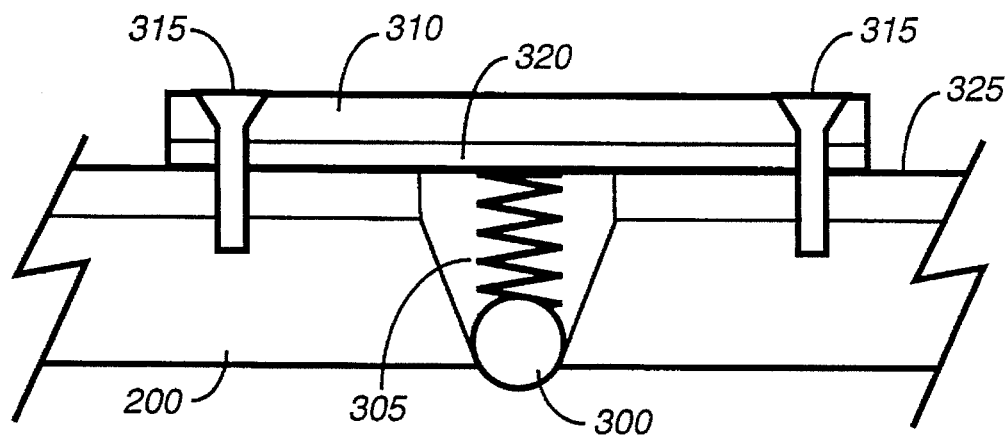
FIG. 3 is a side view of a charging contact utilized by the battery powered device of FIG. 1 in accordance with a first embodiment of the present invention.

FIG. 3 is a side view of a portion of the radio pager 100 which includes a charging contact 140 (FIG. 1) in accordance with the present invention. The charging contact 140 preferably comprises a conventional ball bearing 300 which is held in an opening of the pager housing 200 such that a portion of the bearing 300 can extend therethrough. The diameter of the opening in the housing 200 is less than that of the bearing 300 to prevent the bearing 300 from falling through the housing 200. The contact 140 further comprises a conventional spring 305 which is held in contact with the bearing 300 by a spring cap 310, which can be, for example, simply a small piece of printed circuit board material or plastic or a formed, tooled element. The spring cap 310 is fastened to the housing 200 such that the spring 305 is compressed and held between the bearing 300 and the spring cap 310. Fastening methods can include spot welding or screws 315, as shown.

In accordance with a first embodiment of the present invention, one surface 320 of the spring cap 310 is conductive, such as by coating a conductive material, e.g., copper, thereon. The conductive surface 320 is held in contact with the spring 305 and also to a printed circuit board 325 by the fasteners 315. In this manner, current supplied from an external charger 150 (FIG. 1) through the ball bearing 300, the spring 305, and the conductive surface 320 is provided to a pad (not shown) on the printed circuit board 325. This current is electrically coupled to the battery 135 (FIG. 1) by the pad and runners formed on the printed circuit board 325 such that the battery 135, which is preferably coupled to the printed circuit board 325, is recharged by the current.

Figure 4:
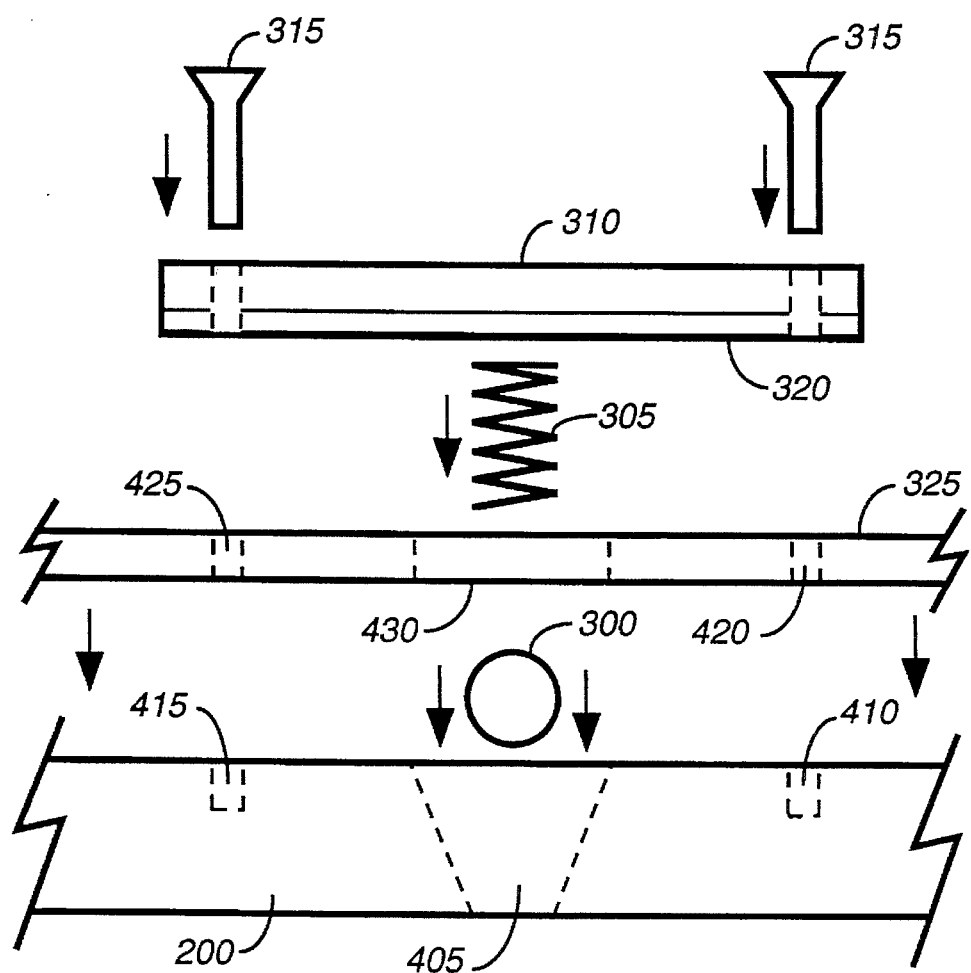
FIG. 4 is an exploded view of the charging contact of FIG. 3 in accordance with the first embodiment of the present invention.

FIG. 4 is an exploded view of the charging contact 140 (FIG. 1 ) in accordance with the first embodiment of the present invention. As can be seen, the housing 200 comprises an opening 405 having a diameter of less than that of the ball bearing 300, which is situated in the opening 405. Additionally, if screws 315 are utilized to fasten the spring cap 310 to the housing 200, holes 410, 415 are formed in the housing 200. Thereafter, a printed circuit board 325 is placed in alignment with the housing 200, i.e., the printed circuit board 325 is placed adjacent to the housing 200 such that holes 420, 425 formed through the printed circuit board 325 are aligned with those formed in the housing 200. Preferably, either the printed circuit board 325 further has a spring hole 430 formed therethrough, or the printed circuit board 325 is formed around the opening 405 in the housing 200. Therefore, the spring 305 can be situated in the opening 405 of the housing 200 without interference by the printed circuit board 325. After the spring 305 has been placed in the opening 405, the spring cap 310 is forcibly pressed down into contact with the printed circuit board 325 such that the spring 305 is compressed and held in contact with the bearing 300 and the conductive surface 320 of the spring cap 310. The spring cap 310 is then fastened to the housing 200, such as by screws 315.

Figure 5:
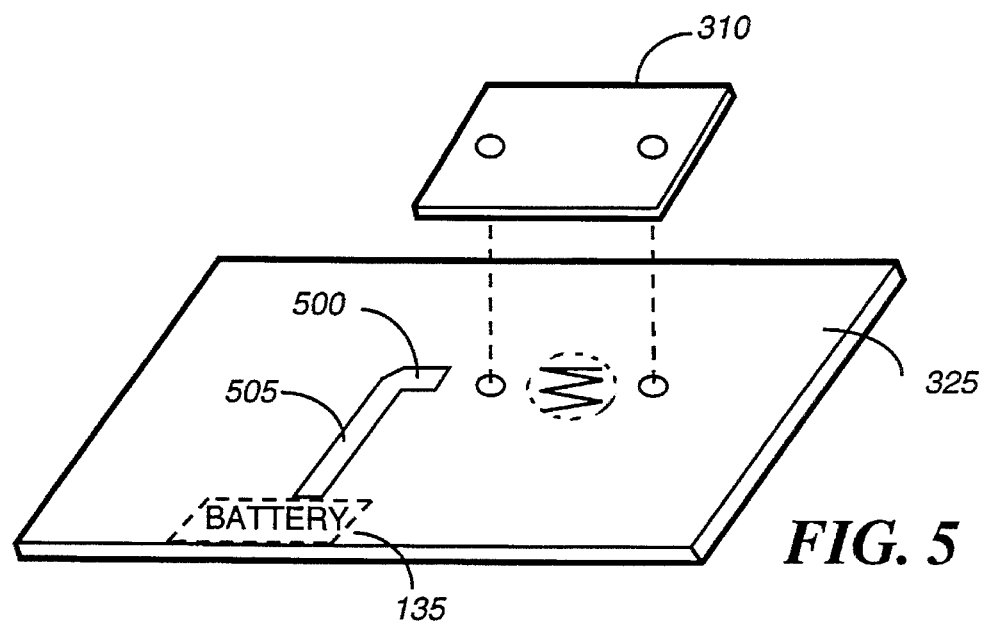
FIG. 5 is a perspective view of a printed circuit board to which elements of the charging contact of FIG. 3 are coupled in accordance with the first embodiment of the present invention.

Referring next to FIG. 5, when the spring cap 310 is fastened to the housing 200, the conductive surface 320 (FIG. 4) is also held in contact with a pad 500 on the printed circuit board 320. Preferably, the pad 500 is coupled by a runner 505 to the rechargeable battery 135 (FIG. 1) for charging purposes.

It will be appreciated that the charging contact 140 as described above utilizes off-the-shelf parts that do not have to be designed or manufactured by the manufacturer of the portable device 100. Therefore, the cost of the elements of the charging contact 140 are relatively low, which is reflected in a lower product cost.

Figure 6:
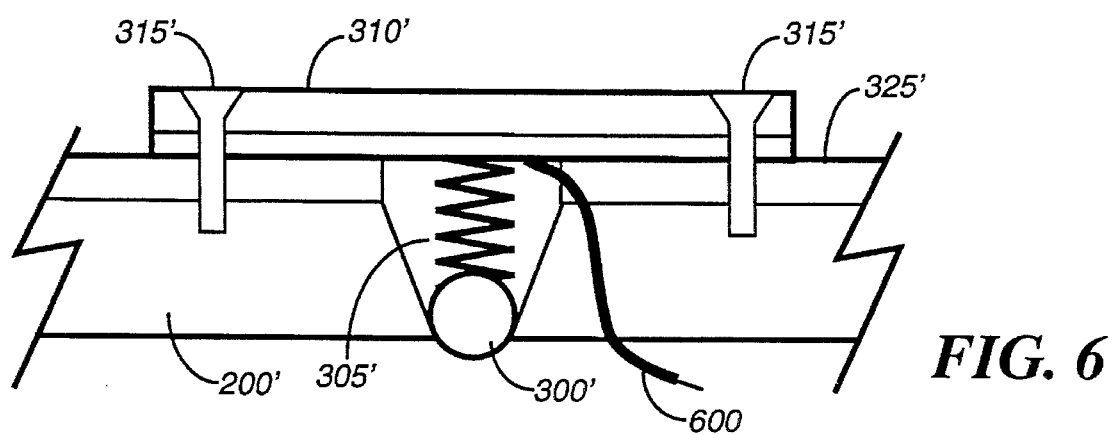
FIG. 6 is a side view of a charging contact in accordance with a second embodiment of the present invention.

FIG. 6 is a side view of a charging contact in accordance with a second embodiment of the present invention. The charging contact comprises a ball bearing 300' which, as in the embodiment described above, is placed into an opening formed in a pager housing 200'. The opening has a diameter less than that of the bearing 300'. Additionally, the contact comprises a spring 305' which is compressed and held in contact with the bearing 300' by a spring cap 310' fastened to the housing 200', such as by screws 315'. In this embodiment, however, the inner surface of the spring cap 310' is not conductive. Rather, a conventional conductive wire 600, or other conductive element, is electrically coupled, e.g., soldered, to the spring 305' and to a pad on the printed circuit board 325'. In this manner, the spring 305' can be conveniently coupled to an area of the printed circuit board 325' which is quite distant from the spring cap 310'.

Figure 7:
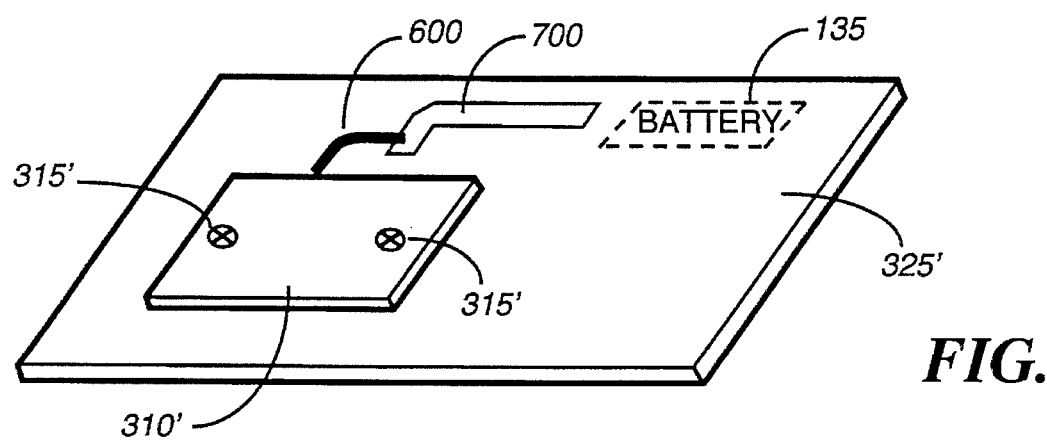
FIG. 7 is a perspective view of a printed circuit board to which elements of the charging contact of FIG. 6 are coupled in accordance with the second embodiment of the present invention.

FIG. 7 is a perspective view of the printed circuit board 325' to which the spring cap 310' is fastened by screws 315', spot welding, or soldering. As can be seen, the wire 600 extends from beneath the spring cap 310' and is soldered to a pad 700 formed on the printed circuit board 325'. The pad 700 is preferably coupled to a terminal of the battery 135 (FIG. 1) such that the battery 135 can be recharged.

In summary, the charging contact as described above includes off-the-shelf parts which are relatively inexpensive. These parts are assembled using conventional methods to form charging contacts for a battery powered, portable device, such as a radio pager. When the device is coupled to a charger, the charging contacts electrically couple to contacts of the charger, and a current is supplied from the charger to the battery of the portable device, thereby recharging the battery.

The charging contact according to the present invention comprises a conventional ball bearing which is placed within an opening of the device housing such that a portion of the bearing extends therethrough. On the inside of the housing, a spring is placed within the opening in contact with the ball bearing. Thereafter, a spring cap, which can be a conventional printed circuit board or a piece of plastic, is pressed into contact with the housing to compress the spring, which is forcibly held between the ball bearing and the spring cap.

In a first embodiment of the present invention, the inside surface of the spring cap which contacts the spring is conductive. When the spring cap is fastened to the housing, a portion of the conductive area contacts a printed circuit board to which the battery is mounted, thereby providing an electrical path from the charger through the ball bearing, the spring, and the conductive surface of the spring cap to the battery.

In a second embodiment of the present invention, a conventional wire is soldered to the spring and to a portion of a printed circuit board to which the battery is mounted. In the second embodiment, current from the charger is supplied to the battery through the ball bearing, the spring, the wire, and runners on the printed circuit board.

It may be appreciated by now that there has been provided a charging contact for use with a portable battery powered device, wherein the contact is formed from off-the-shelf parts which are less expensive than elements which are designed and tooled for use with a specific product.

What is claimed is:

1. A battery powered device utilizing a rechargeable battery, the battery powered device comprising:

a ball bearing having a first diameter for receiving a current;

a housing having an opening formed therethrough in which the ball bearing is situated, the opening having a second diameter of less than the first diameter;

a spring situated in the opening in contact with the ball bearing;

a spring cap fastened to the housing for forcibly holding the spring in contact with the ball bearing; and coupling means for electrically coupling the spring to the rechargeable battery such that the current received by the ball bearing is supplied to the rechargeable battery via the spring.

2. The battery powered device of claim 1, wherein the spring cap is fastened to the housing using conventional spot welding methods.

3. The battery powered device of claim 1, wherein the spring cap is fastened to the housing by at least one screw.

4. The battery powered device of claim 3, wherein the spring cap and the housing have holes formed therein in which the at least one screw is situated.

5. The battery powered device of claim 3, further comprising a printed circuit board situated between the housing and the spring cap and to which the rechargeable battery is mounted.

6. The battery powered device of claim 3, wherein coupling means comprises a conductive surface formed on the spring cap for contacting the spring and the printed circuit board such that the current is provided to the rechargeable battery through the spring, the conductive surface, and runners of the printed circuit board.

7. The battery powered device of claim 1, wherein:

the battery powered device further comprises a printed circuit board to which the rechargeable battery is mounted; and the coupling means comprises a conductive surface formed on the spring cap, wherein the conductive surface is held in contact with the spring when the spring cap is fastened to the housing, and wherein the conductive surface is further held in contact with a pad of the printed circuit board which is coupled to the rechargeable battery such that current is provided from the spring through the conductive surface to the rechargeable battery.

8. The battery powered device of claim 1, further comprising a printed circuit board to which the rechargeable battery is mounted.

9. The battery powered device of claim 8, wherein the coupling means comprises a wire soldered between the spring and a pad of the printed circuit board such that the current is provided to the rechargeable battery through the spring, the wire, and runners of the printed circuit board.

10. A radio pager powered by a rechargeable battery, the radio pager comprising:

a receiver for receiving signals, the receiver coupled to the rechargeable battery;

a ball bearing having a first diameter for receiving a current;

a housing having an opening formed therethrough in which the ball bearing is situated, the opening having a second diameter of less than the first diameter;

a spring situated in the opening in contact with the ball bearing;

a spring cap fastened to the housing for forcibly holding the spring in contact with the ball bearing; and coupling means for coupling the spring to the rechargeable battery such that the current received by the ball bearing is supplied to the rechargeable battery via the spring.

11. The radio pager of claim 10, wherein the spring cap is fastened to the housing using conventional spot welding methods.

12. The radio pager of claim 10, wherein the spring cap is fastened to the housing by at least one screw.

13. The radio pager of claim 12, wherein the spring cap and the housing have holes formed therein in which the at least one screw is situated.

14. The radio pager of claim 12, further comprising a printed circuit board situated between the housing and the spring cap and to which the rechargeable battery and the receiver are mounted.

15. The radio pager of claim 14, wherein the coupling means comprises a conductive surface formed on the spring cap for contacting the spring and the printed circuit board such that the current is provided to the rechargeable battery through the spring, the conductive surface, and runners of the printed circuit board.

16. The radio pager of claim 10, wherein:

the radio pager further comprises a printed circuit board to which the receiver and the rechargeable battery are mounted; and the coupling means comprises a conductive surface formed on the spring cap, wherein the conductive surface is held in contact with the spring when the spring cap is fastened to the housing, and wherein the conductive surface is further held in contact with a pad of the printed circuit board which is coupled to the rechargeable battery such that current is provided from the spring through the conductive surface to the rechargeable battery.

17. The radio pager of claim 10, further comprising a printed circuit board to which the rechargeable battery and the receiver are mounted.

18. The radio pager of claim 17, wherein the coupling means comprises a wire soldered between the spring and a pad of the printed circuit board such that the current is provided to the rechargeable battery through the spring, the wire, and runners of the printed circuit board.

19. A radio pager powered by a rechargeable battery, the radio pager comprising:

a printed circuit board to which the rechargeable battery is mounted;

a receiver mounted to the printed circuit board for receiving signals, the receiver powered by the rechargeable battery;

a housing having an opening formed therethrough, the opening having a first diameter;

a ball bearing for receiving a current, the ball bearing situated within the opening and having a second diameter greater than the first diameter;

a spring situated in the opening in contact with the ball bearing;

a spring cap fastened to the housing for forcibly holding the spring in contact with the ball bearing; and a conductive element for coupling the spring to the rechargeable battery such that the current received by the ball bearing is supplied to the rechargeable battery via the spring.

* * * * *